(12) United States Patent
Wen

(10) Patent No.: US 6,384,566 B1
(45) Date of Patent: May 7, 2002

(54) MOTOR COMBINATION SYSTEM AND METHOD FOR OPERATING AS AN INDUCTION MOTOR OR A STEPPING MOTOR

(75) Inventor: Kuo Shih Wen, Tainan (TW)

(73) Assignee: Umax Data Systems Inc. (TW)

( * ) Notice: Subject to any disclaimer, the term of this patent is extended or adjusted under 35 U.S.C. 154(b) by 78 days.

(21) Appl. No.: 09/643,857

(22) Filed: Aug. 23, 2000

(51) Int. Cl.[7] .................................................. H02P 1/18
(52) U.S. Cl. ........................ 318/727; 318/700; 318/732; 318/69; 318/685; 318/696; 318/590
(58) Field of Search .................... 318/727, 700, 318/732, 685, 696

(56) References Cited

U.S. PATENT DOCUMENTS

| | | | | |
|---|---|---|---|---|
| 4,830,412 A | * | 5/1989 | Raad et al. | 290/31 |
| 5,053,635 A | * | 10/1991 | West | 307/46 |
| 5,420,782 A | * | 5/1995 | Luce et al. | 363/109 |
| 6,147,832 A | * | 11/2000 | Kano | 360/69 |

* cited by examiner

*Primary Examiner*—Jeffrey Donels
*Assistant Examiner*—Rita Leykin
(74) *Attorney, Agent, or Firm*—Troxell Law Office PLLC

(57) ABSTRACT

A motor combination system with operating method for operating as an induction motor or a stepping motor is disclosed. The disclosed system basically encompasses a switch device, an induction motor control module, and a stepping motor control module. Driving signals generated by the induction motor control module and the stepping motor control module are fed into the switch device. The induction motor control module receives a feedback signal for compensating simulation distortion when the disclosed system operates as an induction motor. The switch device is responsive to a mode selection signal to decide which driving signals being selected for driving the disclosed system for operating. In the beginning, the disclosed system operates as a stepping motor for providing torque enough for switching purpose. According to the mode selection signal, the disclosed system may switch to operate as an induction motor when the torque is large enough.

20 Claims, 3 Drawing Sheets

MOTOR COMBINATION SYSTEM AND METHOD FOR OPERATING AS AN INDUCTION MOTOR OR A STEPPING MOTOR

BACKGROUND OF THE INVENTION

1. Field of the Invention

The present invention relates to a system and method for operating as an induction motor or a stepping motor, and more particularly, to a system and method that simulates the characteristics of the induction motor under the configuration of the stepping motor.

The present invention also relates to a system and method for providing a speed control switched between high/low rotational speed that is adapted to a scanner for scanning a sheet under a stepping mode and for previewing or flying back the scan carriage under an induction mode.

2. Description of the Prior Art

The advancement of the electric engineering brings the modern computers to serve people with more functions through the aids of the peripheral devices. For example, users may perform further image processing in their computers on those images generated by scanning photos or sheets through scanners after the images being stored in an image format. Conventionally, scanners usually employ stepping motors for providing dynamics for controlling scan operations because of the characteristics of low rotational speed and high rotational distance, which makes the stepping motors adapted to scanners for controlling the moving operations of the scan lines.

It is also an important issue for the persons skilled in the scanners to reduce the scan time for preview except to promote scan resolutions or to make the scanner steady and smaller. Different scan regions are usually denoted by different marks and in accompanied with the operations of scanning the marks before scanning photos or sheets. However, dynamics for control the preview operations are also provided by the stepping motors mounted in the conventional scanners, which indicates that the preview operations can not be further simplified because of low rotational speed. On the other hand, a higher scan speed may be employed for those low, resolution applications because a low resolution image usually consists of less scan lines than a high resolution image. Moreover, when the scan carriage that is used for scanning the photos or sheets flies back, there only have to move the scan carriage back to its original without any scan operations, which indicates that the operation time can be furthermore decreased.

Nevertheless, although both the DC motors and induction motors have the characteristics of high rotational speed, the lives of the DC motors usually concerned with switch brushes and the induction motors usually need a larger torque while starting. A single dynamics is usually provided by stepping motors for all operations in conventional scanners due to cost consideration. It is difficult to mount more than one motor in a scanner to respectively upgrade the performances of the above two approaches without increasing the manufacture cost.

SUMMARY OF THE INVENTION

The principal object of the present invention is the provision of a motor combination system and method that operates as an induction motor or a stepping motor through a switch mechanism.

The other object of the invention is the provision of a motor combination system and method that performs as an induction motor under a configuration of the stepping motor.

A further object of the invention is the provision of a motor combination system and method that provides different rotational speeds for the applications that require a control switch between high/low rotational speeds.

A still further object of the invention is the provision of a motor combination system and method that provides a switch control between high/low rotational speeds for employing in the applications that require different performance speeds.

The disclosed system basically encompasses a switch device, an induction motor control module, and a stepping motor control module, wherein driving signals generated by the above two modules are directed to the switch device for motor rotation controls. The induction motor control module further receives feedback signals indicative of the instantaneous rotation speed of the motor to compensate for rotation distortions when the motor operates under an induction mode. The switch device is under controlled by a mode selection signal for selecting the driving signal from one of the above two modules for achieving the purpose of controlling motor rotations.

In one embodiment, the induction motor control module encompasses an encoder, a phase detector, a distortion evaluating device, a microprocessor, and a pulse width modulator (PWM). The encoder detects and then encodes the instantaneous conditions of the motor rotations. The phase detector decodes the encoded conditions from the encoder before routing to the distortion evaluating device. The distortion evaluating device compares the decoded instantaneous rotation conditions with an induction signal provided for an actual induction motor to derive a distortion evaluation of the motor rotations. A microprocessor is responsive to the distortion evaluation to generate a waveform adjustment control signal employed for regulating pulse width of the PWM for controlling the motor to go forward or backward. The AC driving circuit is then responsive to the signal output from the PWM for generating the driving signal for feeding into the switch device. In one embodiment, the stepping motor control module basically encompasses a stepping motor driving circuit for generating the driving signal for operating under in the stepping mode and for feeding to the switch device. The switch device is responsive to a detect result associated with the torque and a mode selection signal to switch the motor to operate between the induction and stepping modes.

In the disclosed method, the motor operates under the stepping mode to provide torque for operations. When the torque is large enough, the switch device can switch the motor to operate under the induction mode or to continue in the stepping mode according to the indication of the mode selection signal.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DESCRIPTION OF THE PREFERRED EMBODIMENT

Figure 1:
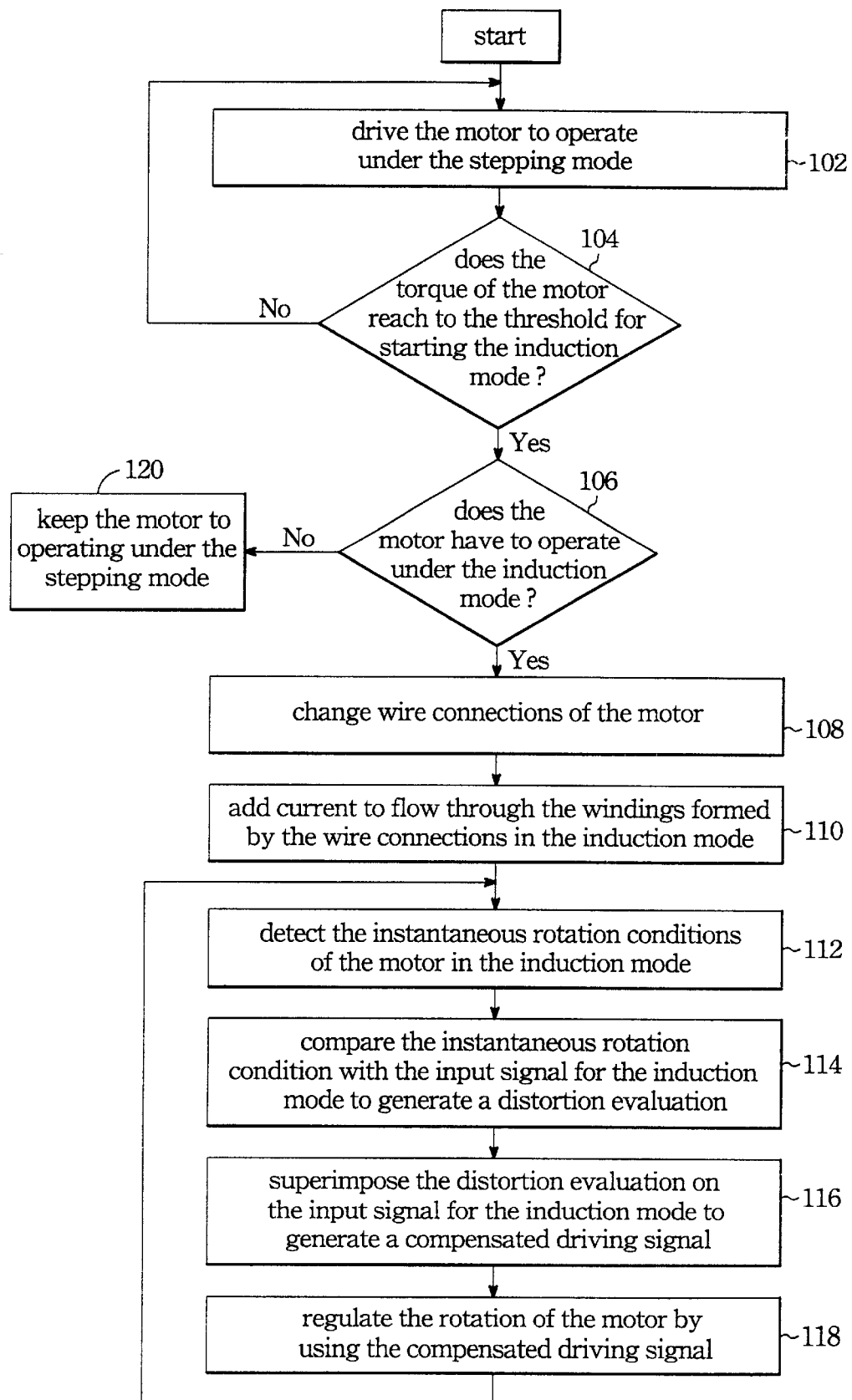
FIG. 1 is a flow diagram illustrative of the operating flow of the disclosed method.

Please refer to FIG. 1, a flow diagram for illustrating the operation flow according to the present invention is shown therein. The disclosed motor combination system operates under a stepping mode when starting to work (block 102), and then the torque of the motor system is detected whether to reach a predetermined threshold indicative of the motor combination system starting to operate under an induction mode (block 104). The motor combination system continues to operate under the stepping mode when the torque does not reach to the predetermined threshold. If the torque is larger than the threshold and a mode selection signal indicative of the induction mode is driven (block 106), portions the wires will be connected so as to reduce the phases of the motor combination system (block 108). Current flowing through the windings formed by the connected wires then drives the motor combination system to operate under the induction mode (block 110). Somewhat distortions still arises from the simulations of the induction mode, an instantaneous rotation condition of the motor combination system is therefore detected (block 112) for comparing with induction signals which the induction motor actually operates to generate a distortion evaluation (block 114). A compensated driving signal is then derived by superimposing the distortion evaluation on the induction signal (block 116) The rotation condition of the motor is then driven by the compensated driving signal for regulating purpose (block 118).

The steps in the aforementioned blocks 112~118 may be an adjustment period for regulating motor rotations under the induction mode, therefore the steps shown in block 112 may be successively performed after the last step in block 118 to restart another adjustment period. Furthermore, the motor combination system keeps operating in the stepping mode when the mode selection signal indicative of the stepping mode being selected (block 120). Additionally, the predetermined threshold may be defined according to the static friction indicative of the force at the moment the motor being driven. Therefore the motor combination system may be switched to operate under the induction mode when the thrust generated by the rotational torque is larger than the static friction.

Figure 2:
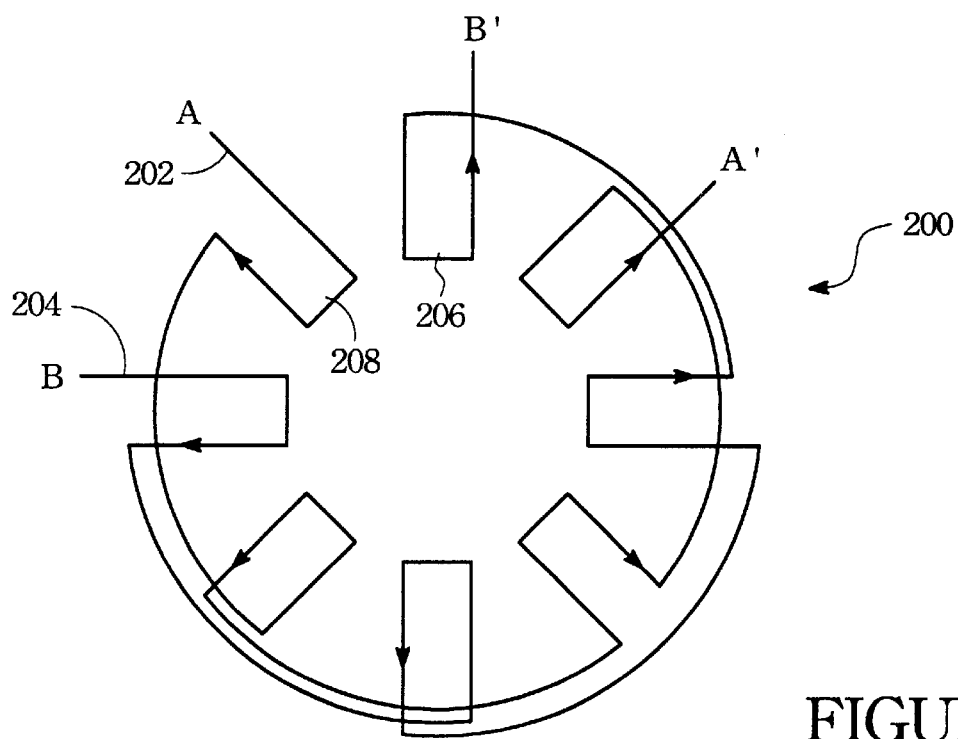
FIG. 2 is an exemplary diagram illustrative of the wire connections when the motor the disclosed system operates under the stepping mode.
Figure 3:
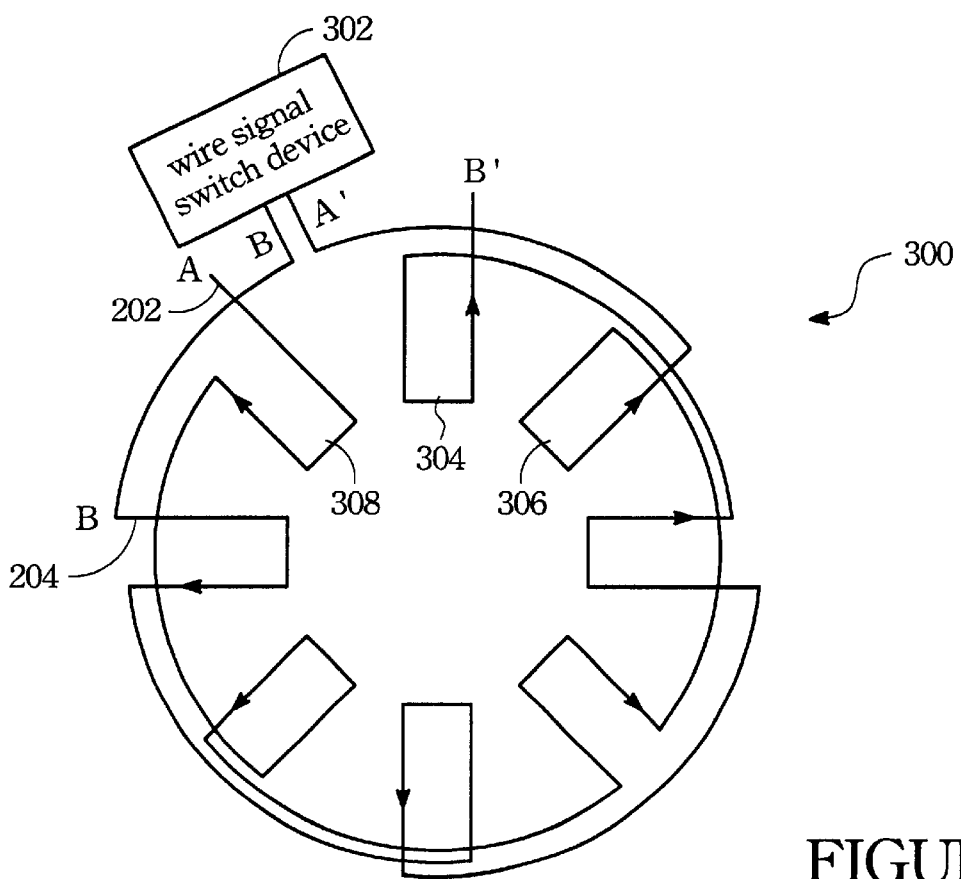
FIG. 3 is an exemplary diagram illustrative of the wire connections when the motor of the disclosed system operates under the induction mode.

The wire connections of the disclosed motor combination system operating under the stepping and induction modes are respectively shown in FIGS. 2 and 3. As noted, a top view of the stators having eight poles is employed for description purpose and the rotor (not shown) is allocated under the stator (the position parallel but under this paper).

The wires 202 and 204 are wound around to form four windings in the motor in FIG. 2, and the windings are excited and demagnetization alternatively to generate magnetic fields for rotations. Furthermore, a wire terminal A' is connected with terminal B through a wire signal switch device 302 to form a single-phase induction motor in FIG. 3. An AC magnetic filed is therefore arisen from the above windings wherein the winding 304 generates a magnetic field having the same direction as the one generated by the winding 306 but opposite to the one generated by the winding 308. Because both the windings 304 and 306 generate magnetic fields having the same direction, the rotor will be driven to have a higher rotational speed than the stepping mode.

Figure 4:
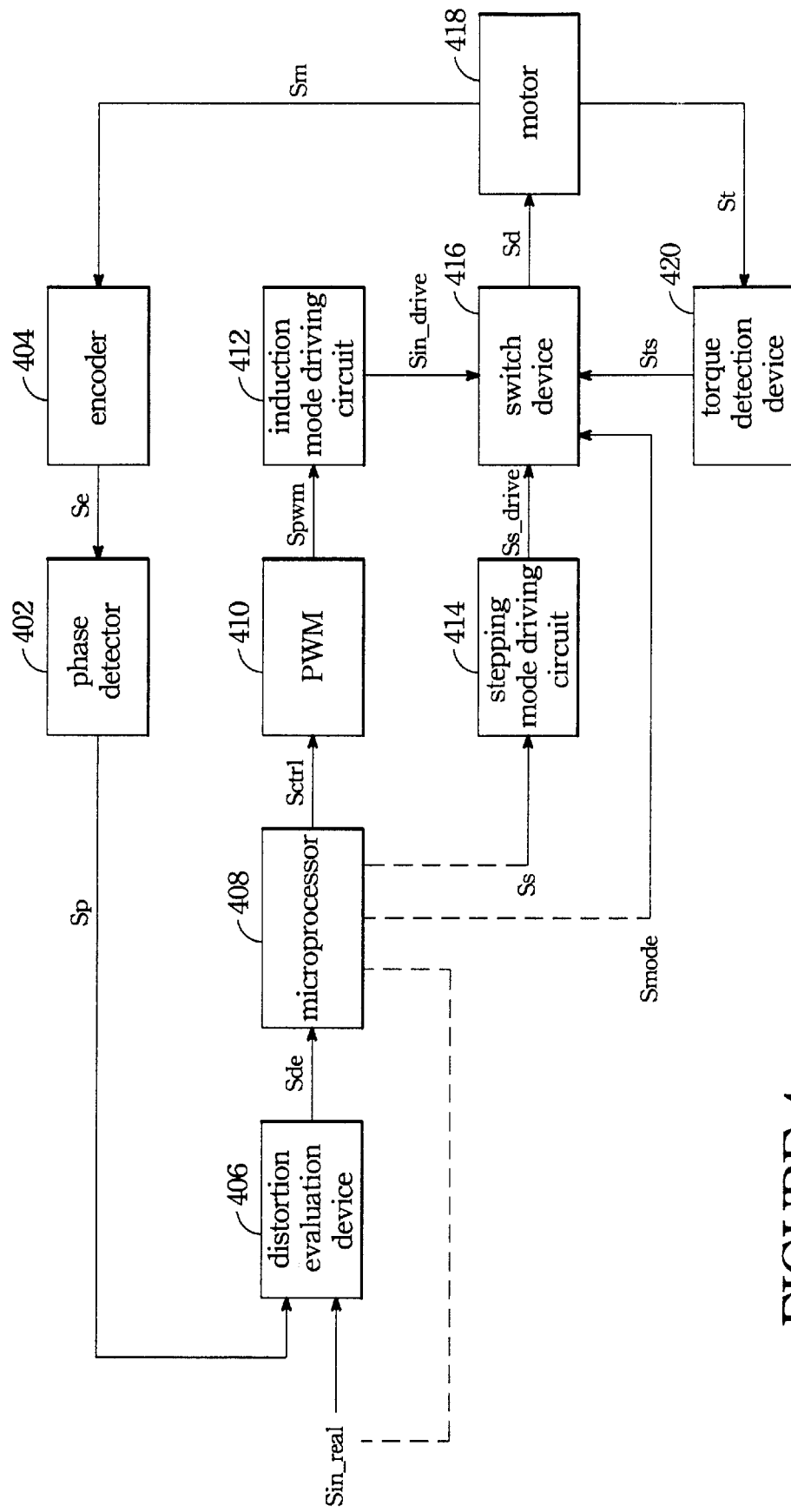
FIG. 4 is a schematic diagram of the disclosed motor combination system.

FIG. 4 shows a schematic diagram illustrative of the disclosed motor combination system, which basically encompasses a phase detector 402, an encoder 404, a distortion evaluating device 406, a microprocessor 408, a pulse width modulator (PWM) 410, an induction mode driving circuit 412, a stepping mode driving circuit 414, a switch device 416, a motor 418, and a torque detection device 420. Please note that the wire signal switch device 302 may be replaced by the switch device 416 in the embodiment. The stepping mode is firstly employed in the embodiment because the motor combination system has insufficient torque to drive the rotor to rotate as an induction motor. That is, the input signal Ss of the stepping mode is selected in the stepping motor driving circuit 414 to force the motor combination system to possess enough torque. A driving signal Ss_drive of the stepping mode is then generated to route into switch device 416. A control signal Sd generated by the switch device 416 is routed to the motor 418 for controlling the motor 418 to operate as a stepping motor. Next, the rotational torque St of the motor 418 is sent to the switch device 416 through the signal line Sts after St being detected by a torque detection device 420. When the torque is large enough and the mode selection signal Smode indicative of the induction mode being selected, the switch device 416 passes an induction mode driving signal Sin_drive to change the behavior of the motor 418 through the signal line Sd. Otherwise, the motor 418 keeps performing under the stepping mode.

Because a simulation approach is employed in the motor 418 to operate as an induction motor, a compensation for distortions between the actual and simulation performances. Firstly, the rotation condition such as instantaneous steps of the motor 418 can be obtained and then encoded in the encoder 404 through the performance signal Sm. The encoded signal Se is then routed to the phase detector 402 to find the phase signal Sp indicative of the current performance of the motor 418. Additionally, Sp will be compared with an waveform signal Sin_real in the distortion evaluating device 406 to derive the distortion evaluation Sde, wherein Sin_real is the signal indicative of the waveform that an actual induction motor should operate. Therefore, the microprocessor 408 in the embodiment receives Sde to generate a waveform adjustment control signal Sctrl that is employed to regulate pulse width of the PWM 410 for controlling the motor 418 to go forward or backward. PWM 410 generates required waveform Spwm for compensation purpose after receiving Sctrl. Spwm is then fed to the induction mode microprocessor 412 for deriving an induction mode driving signal passing through the signal line Sd to control the rotations of the motor 418. Please note that the waveform signals Ss, Smode, and Sin-real are all generated and derived from the microprocessor 408.

As noted, the aforementioned encoder 404 can be established by using the conventional compact disc, and the distortion evaluating device 406 may include a conventional phase-frequency detector to evaluate the distortion from Sin_real. Additionally, the microprocessor 408 may generate Sctrl for controlling the motor 418 to go forward/ backward, or to speed up/slow down according to the requirements of the system. Furthermore, the induction motor driving circuit 412 and the stepping motor driving circuit 414 may be established by conventional circuits employed for induction motors and stepping motors, respectively, and the switch device 416 may be any kind of circuits or electrical devices used for switching purpose. Any modifications and similar arrangements within the spirit of the invention should be included with the appended claims.

In conclusion, the present invention discloses a motor combination system and accompanied with the operating method for simulating the operations of the induction motor in the configuration of the stepping motor. Therefore a motor system that can be employed in the applications that have to operate between high/low rotational speeds can be established. Scanners, which usually requires low rotational speed when scanning photos or sheets, can employ the stepping mode to perform the scanning operations and employ the induction mode to perform the preview or fly back operations in the invention. Only a single motor is required in the invention so as to upgrade both the cost efficiency and performance.

As is understood by a person skilled in the art, the foregoing preferred embodiments of the present invention are illustrated of the present invention rather than limiting of the present invention. It is intended to cover various modifications and similar arrangements included within the spirit and scope of the appended claims, the scope of which should be accorded the broadest interpretation so as to encompass all such modifications and similar structure.

What is claimed is:

1. A motor combination system for operating as an induction motor or a stepping motor, wherein said motor system comprises:
    a motor having a plurality of wires wound around to form windings for generating magnetic fields of said motor combination system;
    induction motor control means for generating an induction mode driving signal, wherein said induction mode driving signal drives said motor to operate as an induction motor;
    stepping motor control means for generating an stepping mode driving signal, wherein said stepping mode driving signal drives said motor to operate as a stepping motor; and
    switching means being responsive to a mode selection signal and a torque detection signal for controlling said motor being driven by said induction mode driving signal or said stepping mode driving signal.

2. The motor combination system according to claim 1, wherein portions of said wires are coupled together through said switching means for decreasing phases of said motor according to said mode selection signal.

3. The motor combination system according to claim 1, further comprising a torque detection means for generating said torque detection signal, wherein said motor operates as an induction motor when a torque indicated by said torque detection signal reaches to a threshold and said mode selection signal indicative of an induction mode being selected.

4. The motor combination system according to claim 3, wherein said threshold is determined by a static friction indicative of the force at a moment said motor being driven.

5. The motor combination system according to claim 1, wherein said induction motor control means comprises:
    a phase detecting means being responsive to an instantaneous operating condition of said motor for generating a phase signal;
    distortion evaluating means for comparing said phase signal and a waveform indicative of said motor being operated under said induction mode to generate a distortion evaluation;
    pulse width modulating means being responsive to said distortion evaluation for generating a pulse-width signal for regulating an operating condition of said motor; and
    induction mode driving means being responsive to said pulse-width signal for generating said induction mode driving signal.

6. The motor combination system according to claim 5, wherein said induction motor control means comprises an encoding means for detecting steps and encoding said steps according to said instantaneous operating condition of said motor.

7. The motor combination system according to claim 5, wherein said pulse width modulating means is responsive to a waveform adjustment control signal generated by a triangular waveform generator for generating a pulse-width signal.

8. The motor combination system according to claim 1, wherein said stepping motor control means comprises a stepping mode driving means being responsive to a stepping mode input signal for generating said stepping mode driving signal.

9. A motor combination system for operating as an induction motor or a stepping motor, wherein said motor system comprises:
    a motor having a plurality of wires wound around to form windings for generating magnetic fields of said motor combination system;
    torque detection means for generating a torque detection signal indicative of an instantaneous torque of said motor, wherein said motor may be switched to operate as an induction motor when a torque indicated by said torque detection signal reaches to a threshold;
    induction motor control means for generating an induction mode driving signal, wherein said induction mode driving signal drives said motor to operate as an induction motor;
    stepping motor control means for generating an stepping mode driving signal, wherein said stepping mode driving signal drives said motor to operate as a stepping motor; and
    switching means being responsive to a mode selection signal and a torque detection signal for controlling said motor being driven by said induction mode driving signal or said stepping mode driving signal.

10. The motor combination system according to claim 9, wherein portions of said wires are coupled together through said switching means for decreasing phases of said motor according to said mode selection signal.

11. The motor combination system according to claim 1, wherein said motor operates as an induction motor when said torque indicated by said torque detection signal reaches to said threshold and said mode selection signal indicative of said induction mode being selected.

12. The motor combination system according to claim 11, wherein said threshold is determined by a static friction indicative of the force at a moment said motor being driven.

13. The motor combination system according to claim 9, wherein said induction motor control means comprises:
    a phase detecting means being responsive to an instantaneous operating condition of said motor for generating a phase signal;
    distortion evaluating means for comparing said phase signal and a waveform indicative of said motor being operated under said induction mode to generate a distortion evaluation;
    pulse width modulating means being responsive to said distortion evaluation for generating a pulse-width signal for regulating an operating condition of said motor; and
    induction mode driving means being responsive to said pulse-width signal for generating said induction mode driving signal.

14. The motor combination system according to claim 13, wherein said induction motor control means comprises an encoding means for detecting steps and encoding said steps according to said instantaneous operating condition of said motor.

15. The motor combination system according to claim 13, wherein said pulse width modulating means is responsive to a waveform adjustment control signal generated by a triangular waveform generator for generating a pulse-width signal.

16. The motor combination system according to claim 9, wherein said stepping motor control means comprises a stepping mode driving means being responsive to a stepping mode input signal for generating said stepping mode driving signal.

17. A method for controlling a motor system to operate as an induction motor or a stepping motor, said method comprising the steps of:

driving said motor system to operate as a stepping motor;

detecting a torque of said motor system; and driving said motor to operate as an induction motor when said torque reaches to a threshold and a selection signal indicative of said motor has to operate as an induction motor.

18. The method according to claim 17, wherein said step of driving said motor to operate as an induction motor comprises the steps of:

detecting an instantaneous rotation condition of said motor system;

generating a distortion evaluation by comparing said instantaneous rotation condition with an induction signal indicative of an actual operation of said induction motor;

superimposing said distortion evaluation on said induction signal; and regulating rotation operations of said motor system.

19. The method according to claim 17, further comprising a method performed before driving said motor system to operate as said induction motor comprising the steps of:

decreasing phases of said motor system by connecting portions of wires of said motor system; and feeding said induction signal into said connected wires.

20. The method according to claim 19, wherein a rotational speed of said motor system when operating as said induction motor is faster than said rotational speed of said motor when operating as an stepping motor.

* * * * *